(12) United States Patent
Jia et al.

(10) Patent No.: US 12,236,642 B2
(45) Date of Patent: *Feb. 25, 2025

(54) CAMERA INTRINSIC CALIBRATION

(71) Applicant: Magic Leap, Inc., Plantation, FL (US)

(72) Inventors: Zhiheng Jia, Weston, FL (US); Etienne Gregoire Grossmann, Menlo Park, CA (US); Hao Zheng, Weston, FL (US); Daniel Roger Dominguez, Sunrise, FL (US); Robert D. Tekolste, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,565

(22) Filed: Dec. 6, 2023

(65) Prior Publication Data
US 2024/0112370 A1    Apr. 4, 2024

Related U.S. Application Data

(63) Continuation of application No. 17/348,627, filed on Jun. 15, 2021, now Pat. No. 11,887,208.
(Continued)

(51) Int. Cl.
*G06T 7/80* (2017.01)
*G02B 27/42* (2006.01)
(Continued)

(52) U.S. Cl.
CPC ............ *G06T 7/80* (2017.01); *G02B 27/4205* (2013.01); *G06V 10/14* (2022.01); *H04N 17/002* (2013.01); *H04N 23/90* (2023.01)

(58) Field of Classification Search
CPC ...... G06T 7/80; G02B 27/4205; G06V 10/14; H04N 17/002; H04N 23/90; H04N 23/56; H04N 23/75; H04N 25/61; H04N 23/55
See application file for complete search history.

(56) References Cited

U.S. PATENT DOCUMENTS 6,665,050 B2 * 12/2003 Shiraishi ............ G03F 7/70316
                                                        355/53
11,887,208 B2    1/2024 Jia et al.
(Continued)

FOREIGN PATENT DOCUMENTS

EP          1533646 A1    5/2005
WO    2019099408 A1    5/2019

OTHER PUBLICATIONS

U.S. Appl. No. 17/348,627, "Notice of Allowance", Sep. 6, 2023, 10 pages.
(Continued)

*Primary Examiner* — Molly Wilburn
(74) *Attorney, Agent, or Firm* — KILPATRICK TOWNSEND & STOCKTON LLP

(57) ABSTRACT

Embodiments provide image display systems and methods for a camera calibration using a two-sided diffractive optical element (DOE). More specifically, embodiments are directed to determining intrinsic parameters of a camera using a single image obtained using a two-sided DOE. The two-sided DOE has a first pattern on a first surface and a second pattern on a second surface. Each of the first and second patterns may be formed by repeating sub-patterns that are lined when tiled on each surface. The patterns on the two-sided DOE are formed such that the brightness of the central intensity peak on the image of the image pattern formed by the DOE is reduced to a predetermined amount.

20 Claims, 14 Drawing Sheets

Related U.S. Application Data

(60) Provisional application No. 63/039,910, filed on Jun. 16, 2020.

(51) Int. Cl.
  *G06V 10/14*    (2022.01)
  *H04N 17/00*    (2006.01)
  *H04N 23/90*    (2023.01)

(56) References Cited

U.S. PATENT DOCUMENTS

| | | | | |
|---|---|---|---|---|
| 2006/0256338 | A1* | 11/2006 | Gratton | G01N 21/6428 |
| | | | | 356/417 |
| 2009/0112482 | A1* | 4/2009 | Sandstrom | G01N 21/6452 |
| | | | | 702/19 |
| 2015/0235447 | A1* | 8/2015 | Abovitz | G02B 27/4205 |
| | | | | 345/633 |
| 2017/0261623 | A1* | 9/2017 | Florido | G01T 1/1648 |
| 2017/0314763 | A1 | 11/2017 | Petronius et al. | |
| 2019/0147625 | A1* | 5/2019 | Jia | H04N 13/246 |
| | | | | 348/187 |

OTHER PUBLICATIONS

Bauer et al., "Geometrical Camera Calibration with Diffractive Optical Elements", Optics Express, vol. 16, No. 25, Dec. 8, 2008, pp. 20241-20248.
EP21825000.9, "Extended European Search Report", Nov. 8, 2023, 13 pages.
PCT/US2021/037500, "International Preliminary Report on Patentability", Dec. 29, 2022, 7 pages.
PCT/US2021/037500, "International Search Report and Written Opinion", Oct. 1, 2021, 8 pages.
JP2022577127, "Office Action" and English translation, Aug. 13, 2024, 8 pages.
EP21825000.9, "Office Action", Oct. 2, 2024, 8 pages.
KR10-2023-7001279, "Office Action" and English translation, Sep. 27, 2024, 17 pages.

\* cited by examiner

Grating pattern

CAMERA INTRINSIC CALIBRATION

CROSS-REFERENCES TO RELATED APPLICATIONS

This application is a continuation of U.S. patent application Ser. No. 17/348,627 filed, Jun. 15, 2021, U.S. Pat. No. 11,887,208, issued Jan. 30, 2024, entitled "CAMERA INTRINSIC CALIBRATION," which is a non-provisional of, and claims the benefit of and priority to U.S. Provisional Patent Application No. 63/039,910, filed Jun. 16, 2020, entitled "CAMERA INTRINSIC CALIBRATION," which are hereby incorporated by reference in their entirety for all purposes.

BACKGROUND

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. A camera may be coupled to the glasses. In order to view the actual location of a real-world object on the augmented and/or virtual reality glasses, the camera needs to be calibrated. Calibrating a camera may include determining intrinsic parameters of the camera. The intrinsic parameters represent a projective transformation from the 3-D camera's coordinates into the 2-D image coordinates. The intrinsic parameters may include the focal length ($f_x$, $f_y$), the principal point and the distortion coefficient(s).

Accordingly, the camera calibration may estimate the parameters of a lens and image sensor of a camera. The determined parameters may be used to correct for lens distortion, measure the size of an object in world units, or determine the location of the camera in a scene in a 3-D scene reconstruction.

As it turns out, the human visual perception system is very complex, and producing a VR, AR, or a mixed reality "MR" technology that facilitates a comfortable, natural-feeling, rich presentation of virtual image elements amongst other virtual or real-world imagery elements is challenging. Systems and methods disclosed herein address various challenges related to VR, AR, and MR technology.

SUMMARY

Embodiments relate generally to image display systems and methods for display system calibration. Embodiments provide a camera intrinsic calibration approach, which is based on using a single image of a light pattern formed by a two-sided diffractive optical element (DOE). The grating pattern formed on each surface of the two-sided diffractive optical element is selected to reduce a brightness of a central intensity peak on the image to a predetermined amount (e.g. about 0.5% to 1.6% of the laser beam emitted from a laser source reaches the zeroth-order virtual light source formed by the DOE).

Embodiments provide a system for determining intrinsic parameters of a plurality of cameras. The system includes a plurality of cameras, a plurality of collimator assemblies, and a processor coupled to the plurality of cameras to receive image data from the plurality of cameras. Each camera is placed in front of one of the plurality of collimator assemblies. Each collimator assembly includes a two-sided diffractive optical element. A grating pattern is formed on each surface of the two-sided diffractive optical element. The processor stores executable instructions that, when executed by the processor, cause the processor to perform the following steps for each camera among the plurality of cameras: receive an image from the camera, identify data pairs, and determine intrinsic parameters of the camera using the identified data pairs for the image. The grating pattern formed on each surface of the two-sided diffractive optical element is selected to reduce a brightness of a central intensity peak on the image to a predetermined amount. Each data pair including pixel coordinates of an intensity peak on the image and virtual light source formed by the two-sided diffractive optical element that corresponds to the intensity peak.

Embodiments further provide a method for determining intrinsic parameters of a plurality of cameras. The method includes providing a plurality of cameras and a plurality of collimator assemblies. Each collimator assembly includes a two-sided diffractive optical element. A grating pattern is formed on each surface of the two-sided diffractive optical element. The method further includes placing the plurality of cameras in front of the plurality of collimator assemblies. Each camera is placed in front of one of the plurality of collimator assemblies. For each camera among the plurality of cameras, the following steps are performed using a computing device: an image is received from the camera, data pairs are identified and intrinsic parameters of the camera are determined using the identified data pairs for the image. The grating pattern formed on each surface of the two-sided diffractive optical element is selected to reduce a brightness of a central intensity peak on the image to a predetermined amount. Each data pair including pixel coordinates of an intensity peak on the image and virtual light source formed by the two-sided diffractive optical element that corresponds to the intensity peak.

Numerous benefits are achieved by way of the present disclosure over conventional techniques. For example, embodiments provide methods and systems that calibrate a real-world image capture device and/or an AR/VR display system using a two-sided DOE. The grating pattern formed on each surface of the two-sided diffractive optical element is selected to reduce a brightness of a central intensity peak on the image to a predetermined amount (e.g. about 0.5% to 1.6% of the laser beam emitted from a laser source reaches the zeroth-order virtual light source formed by the DOE).

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Embodiments are directed to image display systems and methods for one or more camera calibration using a two-sided diffractive optical element (DOE). More specifically, embodiments are directed to determining intrinsic parameters of one or more cameras using a single image, obtained by each camera, of a light pattern formed by a two-sided DOE. A DOE is an optical element that generates, from an input light source, a pattern of beams of light. The direction of each beam of light is known for a given DOE. According to various embodiments, a two-sided DOE has a first grating pattern on a first surface and a second grating pattern on a second surface. Each of the first and second grating patterns may be formed by repeating sub-patterns that are lined when tiled on each surface, without providing any gaps. For example, one side of the DOE may include a 3*3 pattern that is tiled, and the other side of the DOE may include a 19*19 pattern that is tiled such that the two-sided DOE may form a 57*57 pattern including, for example, a repeating sub-pattern.

According to embodiments, a wearable device may include augmented and/or virtual reality wearable (e.g. glasses). One or more cameras may be coupled to the wearable. In order to view the actual location of a real-world object on the augmented and/or virtual reality glasses, the one or more cameras need to be calibrated. Calibrating a camera may include determining intrinsic parameters of the camera. The intrinsic parameters represent a projective transformation from the 3-D camera coordinates into the 2-D image coordinates. The intrinsic parameters may include the focal length ($f_x$, $f_y$), the principal point and the distortion coefficient(s). Accordingly, the camera calibration may estimate the parameters of a lens and image sensor of a camera. The determined parameters may be used to correct for lens distortion, measure the size of an object in world units, or determine the location of the camera in a scene in a 3-D scene reconstruction.

Conventional systems allow for determining the intrinsic parameters of a given camera. Some conventional calibration techniques use checkerboard approach that requires the camera to capture multiple images (e.g. 100+ images) of a checkerboard that is moved with respect to the camera between each image. The acquired images are then processed to determine the intrinsic parameters of the camera. The calibration is accomplished by determining the location of a portion of the checkerboard (e.g. corners of the checkerboard) on each image and correlating the coordinates of that point with the location of the camera. However, for systems such as robotics systems, automobiles, airborne vehicles, underwater and surface vessels, surveillance systems, multiple cameras may be used. For systems where multiple cameras are needed, each camera must be individually intrinsically calibrated, which is time consuming and cumbersome.

Figure 1:
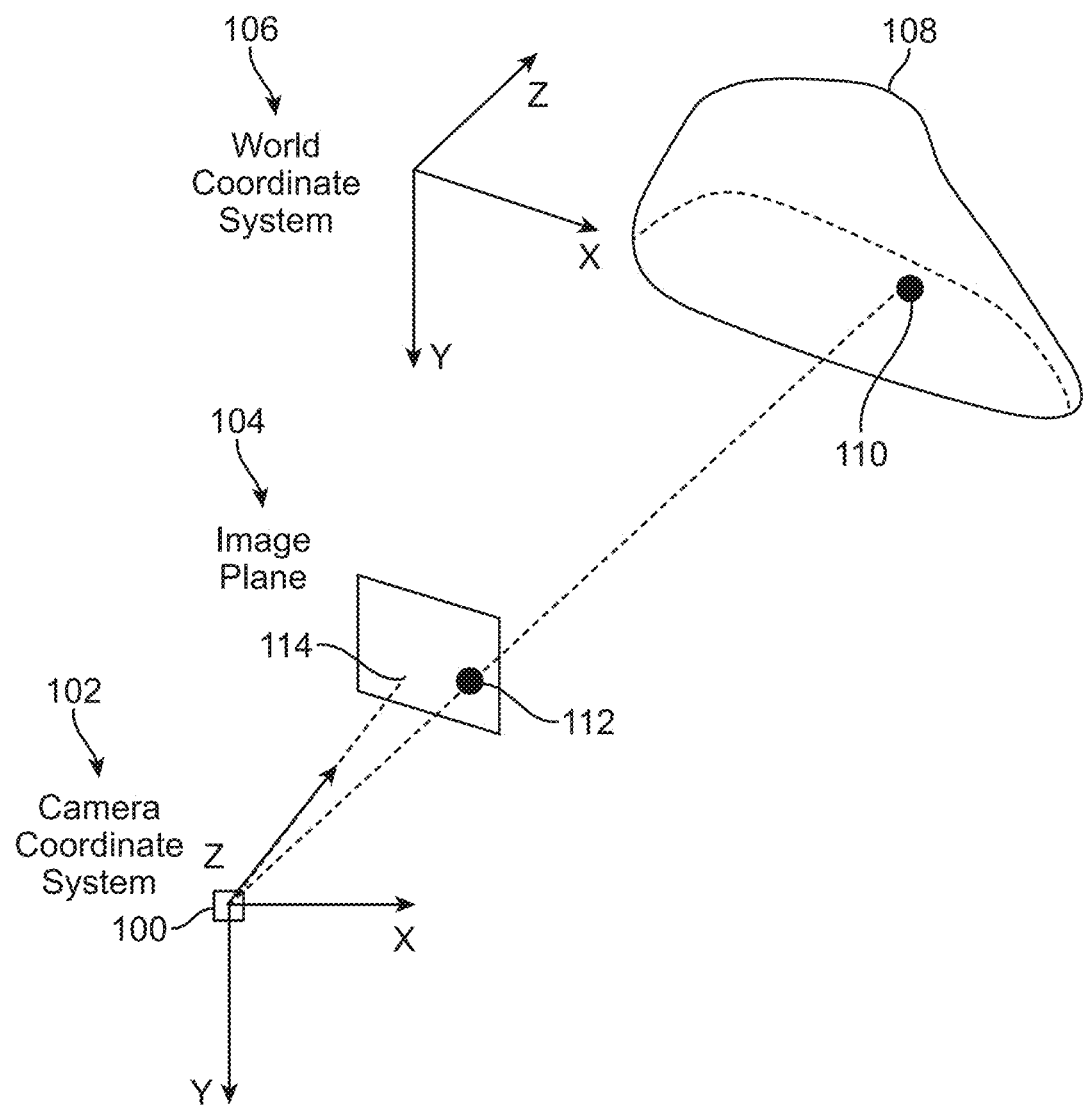
FIG. 1 illustrates a camera coordinate system and a world coordinate system according to exemplary embodiments.

FIG. 1 illustrates a camera coordinate system and a world coordinate system according to exemplary embodiments. A real world object 108 is being imaged using a camera 100 provided at the center of the camera coordinate system 102. The camera 100 maps the 3D points of the real world object 108 to 2D points on the image plane 104. The position of the object 108 is defined using the world coordinate system 106. Using the camera 100, an image of the object 108 is formed on an image plane 104. For example, an image point 112 on the image plane corresponds to a point 110 of the object 108.

It may be necessary to calibrate the camera 100 to achieve accurate reconstruction of a real world object and/or model in a VR/AR representation. Camera calibration may include determining certain parameters associated with the camera and/or the imaging system. For example, camera calibration may include determining one or more of intrinsic parameters of the camera.

The intrinsic parameters may represent a projective transformation from the camera coordinate system 102 into the 2-D image coordinates on the image plane 104. The intrinsic parameters include the focal length ($f_x$, $f_y$), the principal point and the distortion coefficient. The focal length refers to the distance between the center of the camera coordinate system 102 and the image plane 104. The principal point 114 is where principal axis (i.e. the z-axis of the camera coordinate system 102) intersects the image plane 104. The distortion coefficient may be a coefficient associated with a particular camera that is used to correct the distortion introduced by the lens of the particular camera. Conventional systems use predefined calibration grids (e.g. known 3D calibration target objects such as checkerboard objects) for intrinsic camera calibration. Several observations with different orientations are needed to estimate the parameters of a single camera.

According to various embodiments, a two-sided DOE including a first grating pattern on a first surface, and a second grating pattern on second, opposite, surface may be used for intrinsic calibration of one or more cameras. According to various embodiments, the first surface may include a repeating 3*3 pattern that is lined when tiled, and the second surface may include a repeating 19*19 pattern that is lined when tiled. When a laser is turned on and the light is directed toward the DOE, the DOE may create a pattern of virtual lights (referred as "virtual light sources") at known positions. The virtual light sources formed by the DOE may be seen by an observer (e.g. a camera) located (and properly oriented) within a region of space called the "eye box of the DOE." Alternatively, a camera placed in the eye box of the DOE can capture the virtual light sources formed by the DOE.

In a digital image produced by a camera, each virtual light source may be identifiable as a local maximum of gray levels. An image may be automatically processed to compute a list of the local maxima. The notation $_pU'_1, \ldots, _pU'_N$ may be used to illustrate a list of images of projections of virtual light sources in an image. Each $_pU'_i$ is a two-dimensional vector consisting of the x-coordinate and the y-coordinate of a point in an image. The two-dimensional vectors may be referred as intensity peaks.

The 3D position of a virtual light source $_DA$ may be represented by a vector of four homogeneous coordinates $_DA=(x, y, z, t)$. Accordingly, a virtual light source at a finite distance may be uniquely represented by a vector $_DA=(x, y, z, 1)$, while a virtual light source at infinity may be uniquely represented by a vector $_DA=(x, y, z, 0)$. The coordinates for the vector $_DA$ are written in a "display system of coordinates". When creating a DOE, the positions of the virtual light sources may be selected according to, for example, the particular implementation. Thus, an exemplary DOE creates a set of N virtual light sources $_DA_1, \ldots, _DA_N$ with known coordinates in a referential coordinate system attached to the DOE. In particular, one virtual light source, referred as "zeroth-order light source", corresponds to direct transmission of the laser through the grating. The zeroth-order virtual light source is brighter than the other light sources.

A first constraint for the design of the pattern on each surface of the two-sided DOE is to have the brightness of the zeroth-order virtual light source at an optimal level. The brightness of the zeroth-order virtual light source must be balanced so as to be bright enough to be distinguishable over the remaining virtual light sources produced by the two-sided DOE, but not too bright so as to mislead the camera on the brightness of the neighboring virtual light sources. That is, when the brightness of the zeroth-order virtual light source is too high, it saturates the camera to a point where accurate calibration cannot be performed. When the brightness of the zeroth-order virtual light source is too low, the camera cannot identify the zeroth-order virtual light source. Embodiments provide a grating pattern on each surface of the DOE so as to reduce the brightness of the zeroth-order virtual light source to a predetermined amount (e.g. to about 1±0.5% of the laser beam emitted from the laser source). That is, only the predetermined amount of the laser beam emitted from the laser source reaches the zeroth-order virtual light source.

A second constraint for the design of the pattern on each surface of the two-sided DOE is to have a uniform brightness across the remaining virtual light sources (e.g. the virtual light sources other than the zeroth-order virtual light source). Specifically, if the remaining virtual light sources are too dim, the camera may not be able to detect them.

Embodiments provide a two-sided DOE that satisfies both constraints and provides for fast and efficient intrinsic calibration of one or more cameras. Embodiments use both surfaces of a DOE by placing a pattern on each of the two surfaces of the DOE so that the combined effect of the two patterns working together gives results in a pattern that satisfies both constraints. The brightness of the zeroth-order spot at the output (e.g. light pattern formed by the DOE) may be reduce to about 1.1±0.5% with a two-sided DOE. According to various embodiments, a first pattern that creates an M*M (e.g. 19*19) array is placed on one surface of the DOE, and a second pattern that creates an N*N (e.g. 3*3) array is placed on the opposite surface of the DOE. The second pattern may fan out at very high angles compared to the first pattern. The two-sided DOE may be formed by tiling the M*M array on the second surface to match a size of the N*N array on the first surface, such that the image captured by each camera includes $N^2$ repeating sub-patterns. That is, in some embodiments, the DOE may be formed by creating a 3*3 copy of the 19*19, and tiling the copies without a gap so as to have a continuous pattern forming a regular grid (e.g. 9 copies of the same pattern formed without a gap therebetween).

Figure 2:
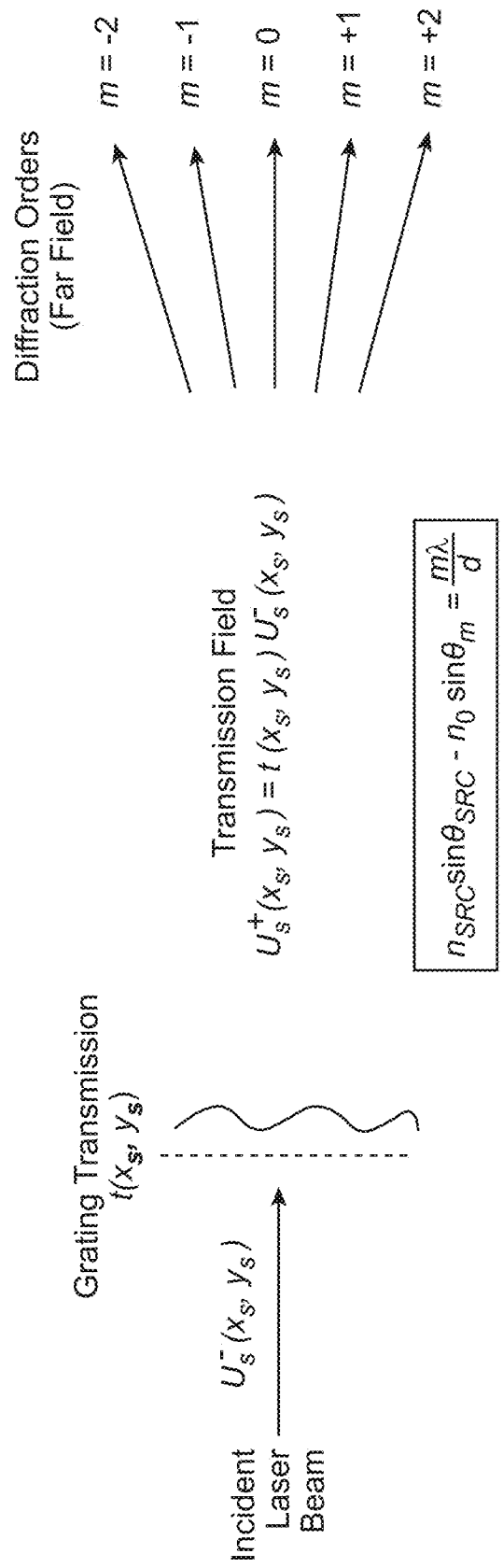
FIG. 2 illustrates a schematic explanation of how a diffractive optical element (DOE) works according to exemplary embodiments.

The zeroth-order virtual light source corresponds to m=0 on FIG. 2 illustrating a schematic explanation of how a DOE works according to exemplary embodiments. The incident laser beam is directed toward the DOE having a predetermined grating. The light transmitted from the DOE is recaptured on a surface or an image at various diffraction orders (e.g. m=−2, m=−1, m=0, m=+1, m=+2)

The surfaces of the DOE may include a repetitive series of narrow-width grooves separated by distance d. The incident light impinges on the grating at an angle $\theta_{SRC}$, as measured from the surface normal. The light of order m exiting the grating leaves at an angle of $\theta_m$, relative to the surface normal. Utilizing some geometric conversions and the general grating expression, an expression for the transmissive diffraction grating can be found:

$$n_{SRC}\sin\theta_{SRC} - n_0\sin\theta_m = \frac{m\lambda}{d}$$

where n_src and n_0 are the refractive indices of the material before and after the grating interface, respectively.

A two-sided DOE is typically created by etching a microscopic grating onto each solid surface of a substrate such as a silicon crystal. A camera may be placed to have its entrance pupil entirely contained in the eye box of the two-sided DOE, and to be oriented so that the camera forms an image of the virtual light sources formed by the two-sided DOE. The orientation of the two-sided DOE may also be approximately known.

If $_DA_1$ is the zeroth-order virtual light source, the brightest intensity peak $_pU'_i$ may be identified among the intensity peaks $_pU'_1, \ldots, _pU'_N$ of an image. The brightest intensity peak may be assigned $_pU'_1:=_pU'_i$. From this zeroth-order intensity peak, each intensity peak $_pU'_i$ corresponding to every virtual light source $_DA_i$ may be identified. Once the intensity peak pairs are identified, the intrinsic parameters of the camera can be calculated.

Figure 3A:
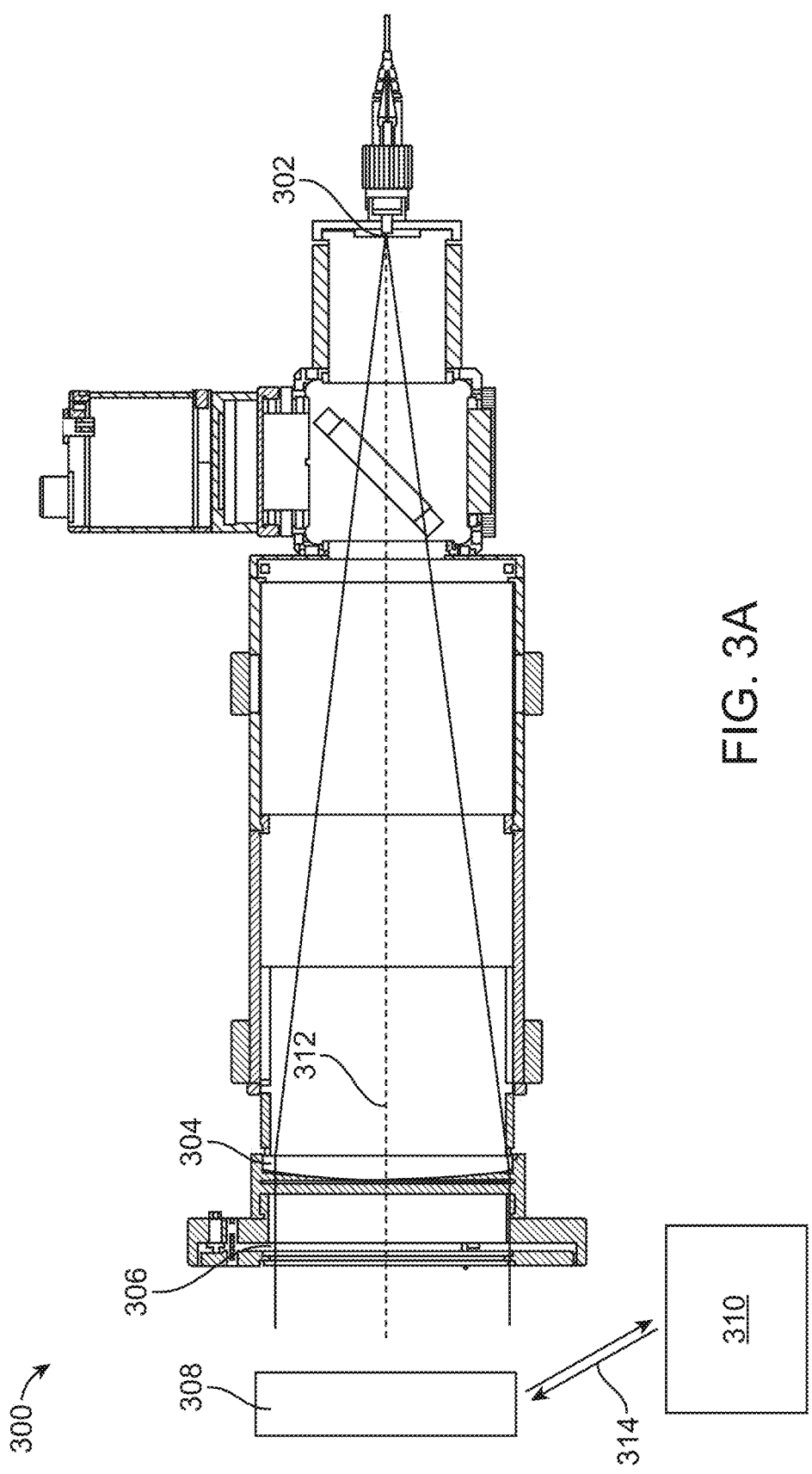
FIG. 3A illustrates a cross-sectional view of an exemplary system for intrinsic calibration of a camera using a two-sided DOE according to some embodiments.
Figure 3B:
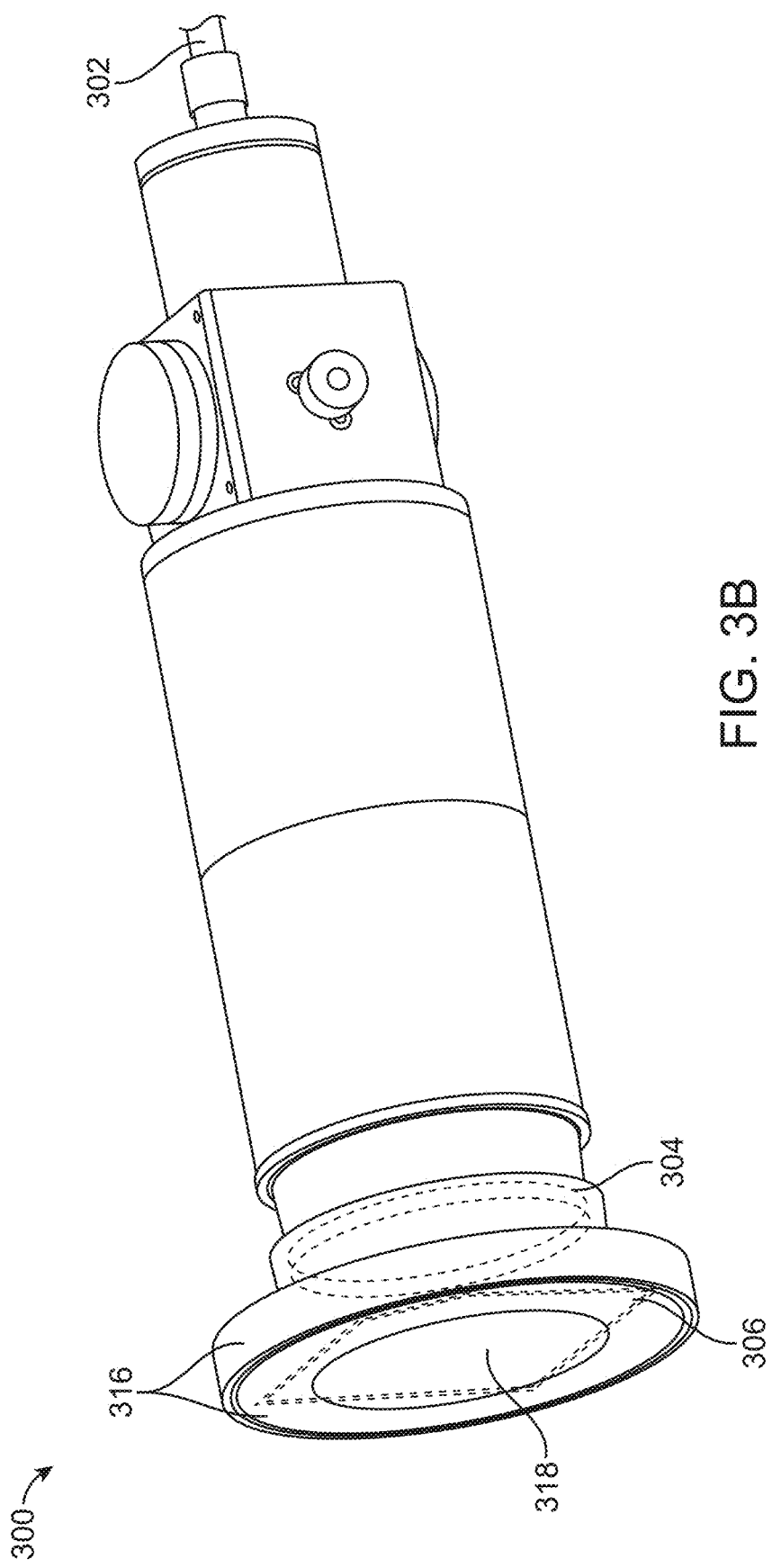
FIG. 3B illustrates a planar view of the exemplary system illustrated in FIG. 3A according to some embodiments.

FIGS. 3A-3B illustrate an exemplary system for intrinsic calibration of a camera according to various embodiments. Specifically, FIG. 3A illustrates a cross-sectional view of an exemplary collimator assembly for intrinsic calibration of a camera using a two-sided DOE, and FIG. 3B illustrates a planar view of the exemplary collimator assembly illustrated in FIG. 3A.

The exemplary system may include a collimator assembly 300 including a two-sided DOE 306, a collimating lens 304 and a laser source 302. A camera 308 may be placed in the eye box of the two-sided DOE to capture an image of a light patterns formed by the two-sided DOE 306. The two-sided DOE 306 is provided between the laser source 302 and the camera 308. As shown in FIG. 3B, the DOE 306 may be provided in a gimbal and DOE mount 316. The collimator assembly 300 may include a protective window 318 to protect the DOE 306 from pollutants and impact from the exterior environment and/or from getting scratched or otherwise damaged.

According to various embodiments, the laser source 302 may include a solid state laser. The light emitted from the laser source 302 may pass through the collimating lens 304. The light exiting the collimated lens 304 is parallel with the optical axis 312 of the collimating lens 304. The light exiting the collimated lens 304 propagates toward the DOE 306. An exemplary two-sided DOE 306 may form a 57*57 pattern of virtual light sources (e.g. 57*57 collimated beams may come out of the two-sided DOE 306).

As provided above, the design of the DOE 306 should satisfy two constraints: the brightness of the zeroth-order virtual light source should be reduced to a predetermined level (e.g. to about 0%, or to a range between about 0% and about 1.6% of the laser beam emitted from the laser source), and a uniform brightness must be achieved across the remaining virtual light sources. When these constraints are not satisfied, the resulting image may not have a uniform repeating sub-pattern, as illustrated in FIG. 4.

Figure 4:
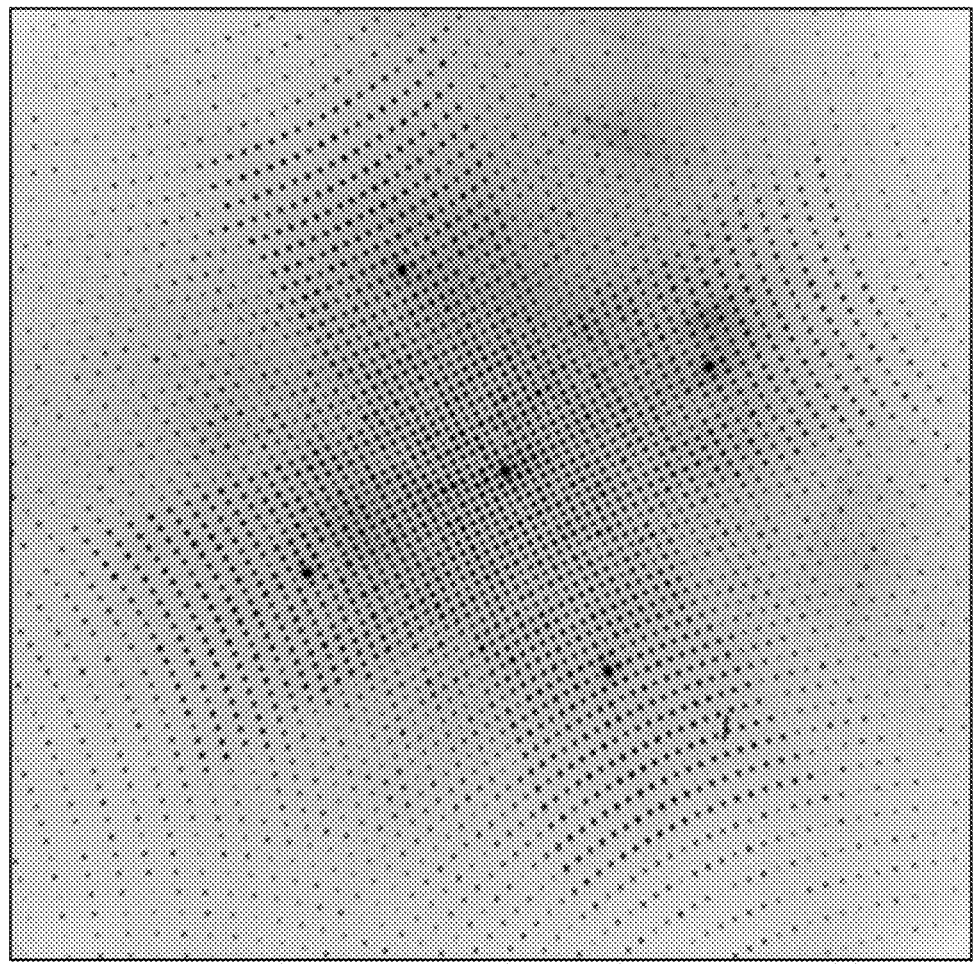
FIG. 4 illustrates a schematic representation of the light pattern formed by a two-sided DOE with a non-optimal grating pattern according to some embodiments.
Figure 7:
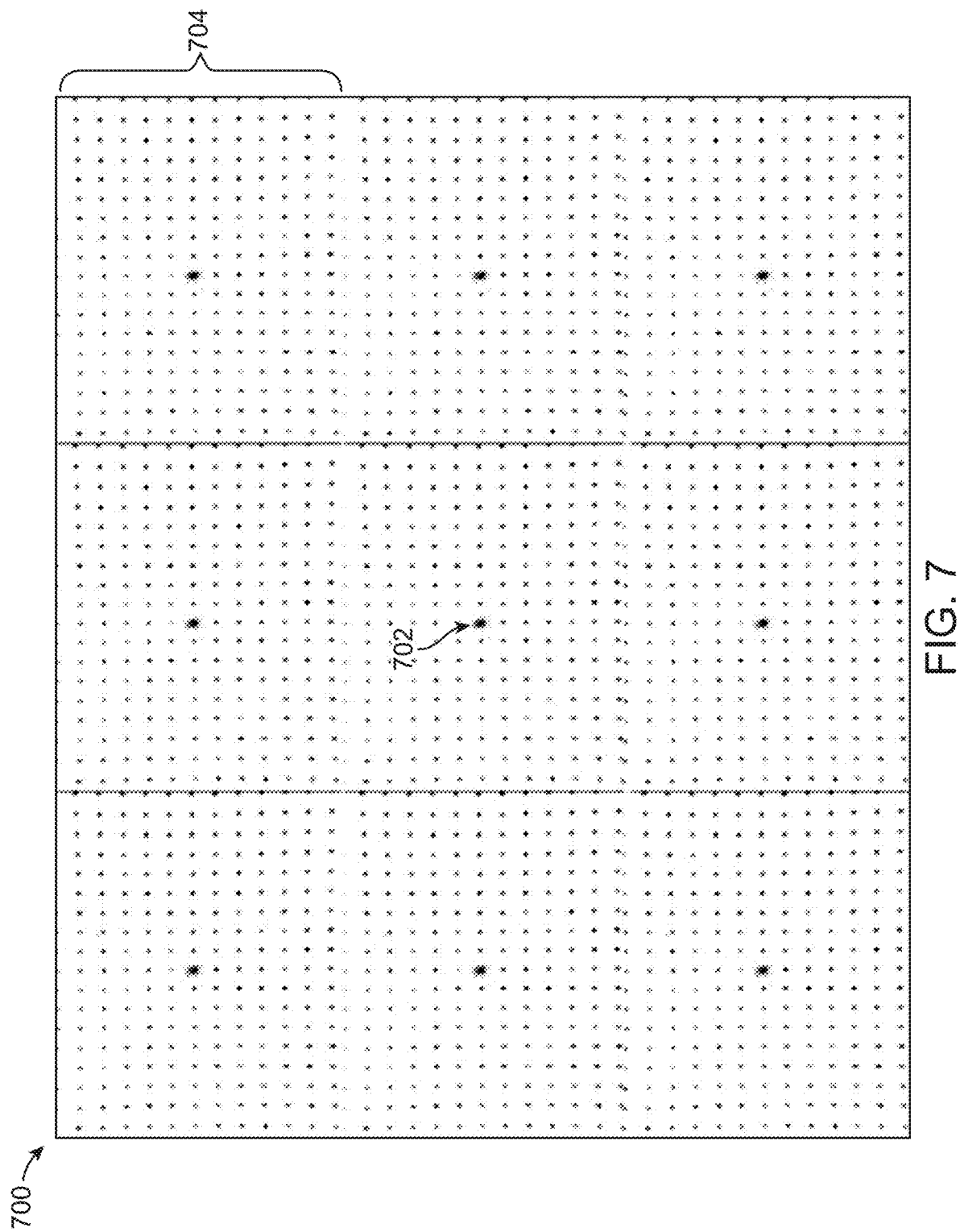
FIG. 7 illustrates a schematic representation of the light pattern formed by the exemplary two-sided DOE with an optimal grating pattern according to some embodiments.

FIG. 4 illustrates a schematic representation of the light pattern formed by a two-sided DOE with a non-optimal grating pattern (as captured by the camera) according to some embodiments. The light pattern has poor uniformity at the corners, showing that any given pattern on either surface of the DOE does not result in an optimal light pattern that can be used for intrinsic calibration of the camera. The first grating on the first surface of the DOE generates a 19*19 dot pattern, and the second grating on the second surface of the DOE distributes the 19*19 dot pattern them to a 3*3 pattern. The image illustrated in FIG. 4 includes 9 blocks with a 19*19 dot pattern in each block. The cross shape shown in the image is an artifact due to diffraction efficiency difference in each block. In optimal conditions, the 9 blocks should have equal brightness (as shown in FIG. 7 discussed below).

Referring back to FIG. 3A, the camera 308 may pick up all the different collimated beams coming at it from across the two-sided DOE 306 and capture an image of the light pattern formed by the collimated light passing through the two-sided DOE 306. According to various embodiments, the two-sided DOE 306 must be sized to ensure that the virtual light sources at high angles are within a field of view of the camera (e.g. the virtual light sources at high angles should run from the DOE into the lens aperture of the camera). For example, the two-sided DOE 306 may cover an area of 100 pixels in the horizontal dimension, 100 pixels in the vertical dimension and 140 pixels in the diagonal. According to various embodiment, the zeroth-order virtual light source may correspond to a central intensity peak of the image captured by the camera.

The camera 308 may transmit the captured image data (e.g. image of the pattern of virtual light sources) to an image processing server computer 310 (or the image may be retrieved by the image processing server computer 310 from the camera 308) via a wired or wireless connection 314. According to various embodiments, the system may include multiple cameras, each placed in front of a corresponding collimator assembly. The multiple cameras may all transmit the images to the image processing server computer 310 for processing (e.g. for determining the intrinsic parameters of each camera). The image processing server computer 310 may include a processor, a memory, a display and input elements (including but not limited to a touch screen, a keyboard, a mouse, etc.). The processor can be implemented as one or more integrated circuits (e.g., one or more single core or multicore microprocessors and/or microcontrollers), and is used to control the processing of image data (e.g. images) received from the one or more cameras. The processor can execute a variety of programs in response to program code or computer-readable code stored in the system memory, and can maintain multiple concurrently executing programs or processes.

The system memory can be implemented using any combination of any number of non-volatile memories (e.g., flash memory) and volatile memories (e.g., DRAM, SRAM), or any other non-transitory storage medium, or a combination thereof media. System memory may store an operating system (OS) and computer code, executable by the processor, for performing any of the functions described herein. Details of an exemplary image processing server computer 310 are provided below in connection with FIG. 11.

Embodiments provide a two-sided DOE that satisfies both constraints and provides for fast and efficient intrinsic calibration of one or more cameras. Embodiments use both surfaces of a DOE by placing a pattern on each surface so that the combined effect of the two patterns working together gives results in a pattern that satisfies both constraints. According to various embodiments, anti-reflective coating is not applied to either surface.

Figure 5:
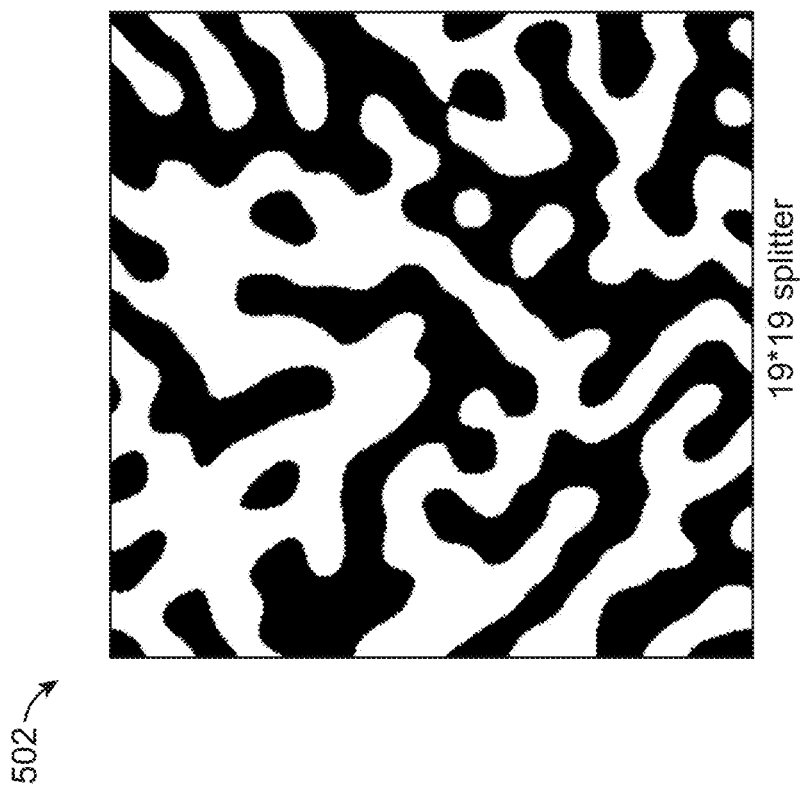
FIG. 5 illustrates a schematic representation of exemplary grating patterns of an exemplary two-sided DOE according to some embodiments.
Figure 5:
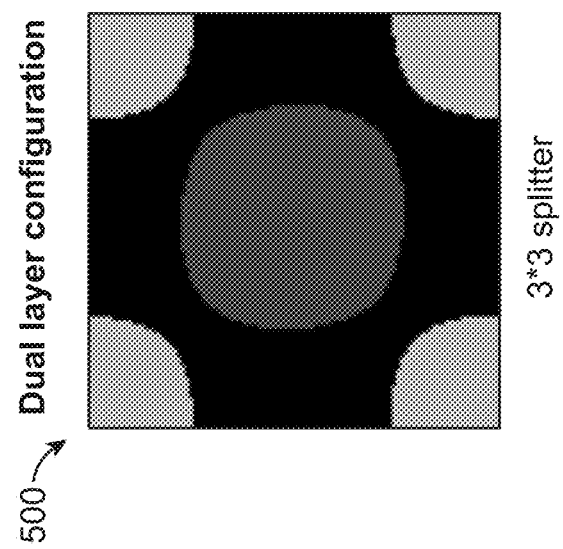

FIG. 5 illustrates a schematic representation of exemplary grating patterns of an exemplary two-sided DOE according to some embodiments. According to various embodiments, a first pattern 500 that creates 3*3 array is placed on a first surface of the DOE. The second pattern 502 that creates a 19*19 array is placed on a second (i.e. opposite) surface of the DOE. The first pattern 500 may fan out at very high angles compared to the second pattern 502. The two-sided DOE may be formed by creating a 3*3 copy of the 19*19, and tiling the copies without a gap so as to have a continuous pattern forming a regular grid. Table-1 provides optical specifications for an exemplary two-sided DOE. The uniformity identified in the Table-1 may be defined as:

Uniformity=Range($N,E,S,W,NE,NW,SE,SW$)/Min($N,E,S,W,NE,NW,SE,SW$)

where N, E, S, W, NE, NW, SE, SW is the brightness of each spot on the 3*3 spot generator. The zeroth-order is excluded in this calculation.

TABLE 1

| Optical Specifications for Exemplary Two-Sided DOE | |
|---|---|
| Parameter | Specification |
| Wavelength of Operation | 632.8 nm |
| Diffraction Efficiency (57*57 Array) | >60% |
| Uniformity (3*3 Array) | <60% |
| Primary Zero Order energy (%), On-Axis Illumination (57*57 Array) | 1.1 ± 0.5% |
| Sub-pattern Zero Order Energy (%), On-Axis Illumination (57*57 Array) | Constrained by Diffraction Efficiency and Uniformity Specs |

Figure 6:
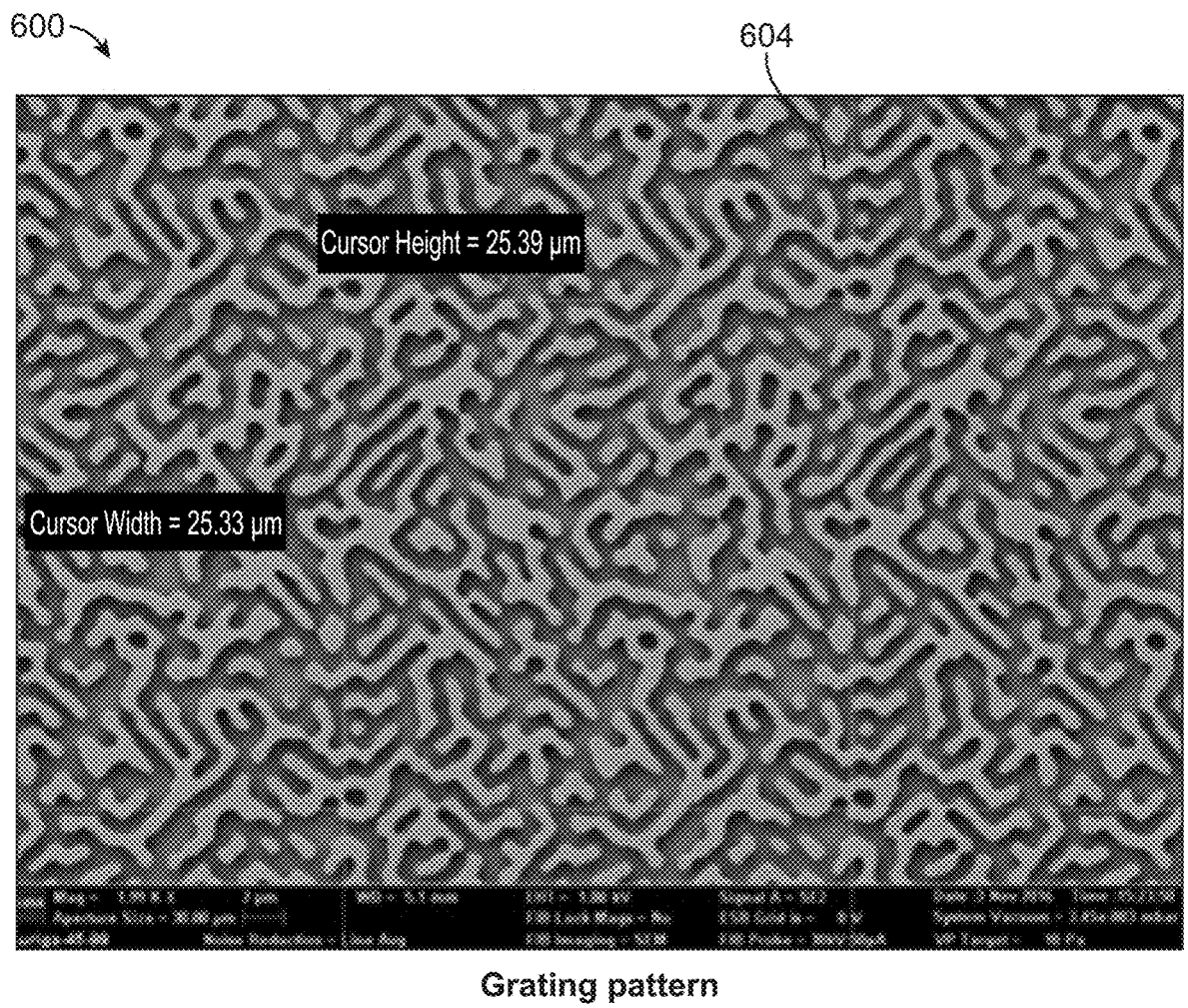
FIG. 6 illustrates a schematic representation of an exemplary grating pattern according to some embodiments.

FIG. 6 illustrates a schematic representation of an exemplary grating pattern according to some embodiments of. The grating pattern 600 may be formed by tiling one of the patterns illustrated in FIG. 5 (e.g. the second pattern 502). As illustrated with the virtual separating lines 604 (used for illustration purposes on the figure), the grating pattern 600 is formed by placing a plurality of the 19*19 arrays next to each other without leaving any gaps. The pattern must be repeated to match the size of the opposite surface, and the repeated arrays do not need to be repeated in their entirety (e.g. the array as at the corners or edges of the grating pattern 600 may be cut-off). If the exemplary two-sided DOE includes the first pattern that creates 3*3 array on a first surface of the DOE and the second pattern that creates a 19*19 array on a second (i.e. opposite) surface of the DOE, the DOE may be a 57*57 array DOE. When the collimated light travels through the two-sided DOE, a light patterns in formed at a predetermined distance from the two-sided DOE. For example, an exemplary light pattern 700 formed by the two-sided DOE is illustrated in FIG. 7.

FIG. 7 illustrates a schematic representation of the light pattern formed by the exemplary two-sided DOE according to some embodiments. The light pattern 700 may include 9 repeating sub-patterns 704, the zeroth-order spot 702 being the brightest spot at the center of the light pattern 700. By reducing the brightness (e.g. the energy) of the zeroth-order spot to about 1.1±0.5%, meaning that about 1.1±0.5% of the input light (e.g. collimated light propagated on the DOE) reaches the zeroth-order spot 702, embodiments allow for intrinsic calibration of a camera using a single image. In effect, constraining the zeroth-order spot 702 (e.g. its brightness is reduced to 1.1±0.5%) and the diffraction efficiency in turn constraints the central spots of the repeating sub-patterns 704 around the central pattern (e.g. the central square in the light pattern 700 containing the zeroth-order spot 702 illustrated in FIG. 7). According to various embodiments, the diffraction efficiency is constraint to be greater than 60% meaning that of the energy coming into the DOE, greater than 60% has to end up in one of the spots in the 57*57 array.

Figure 8A:
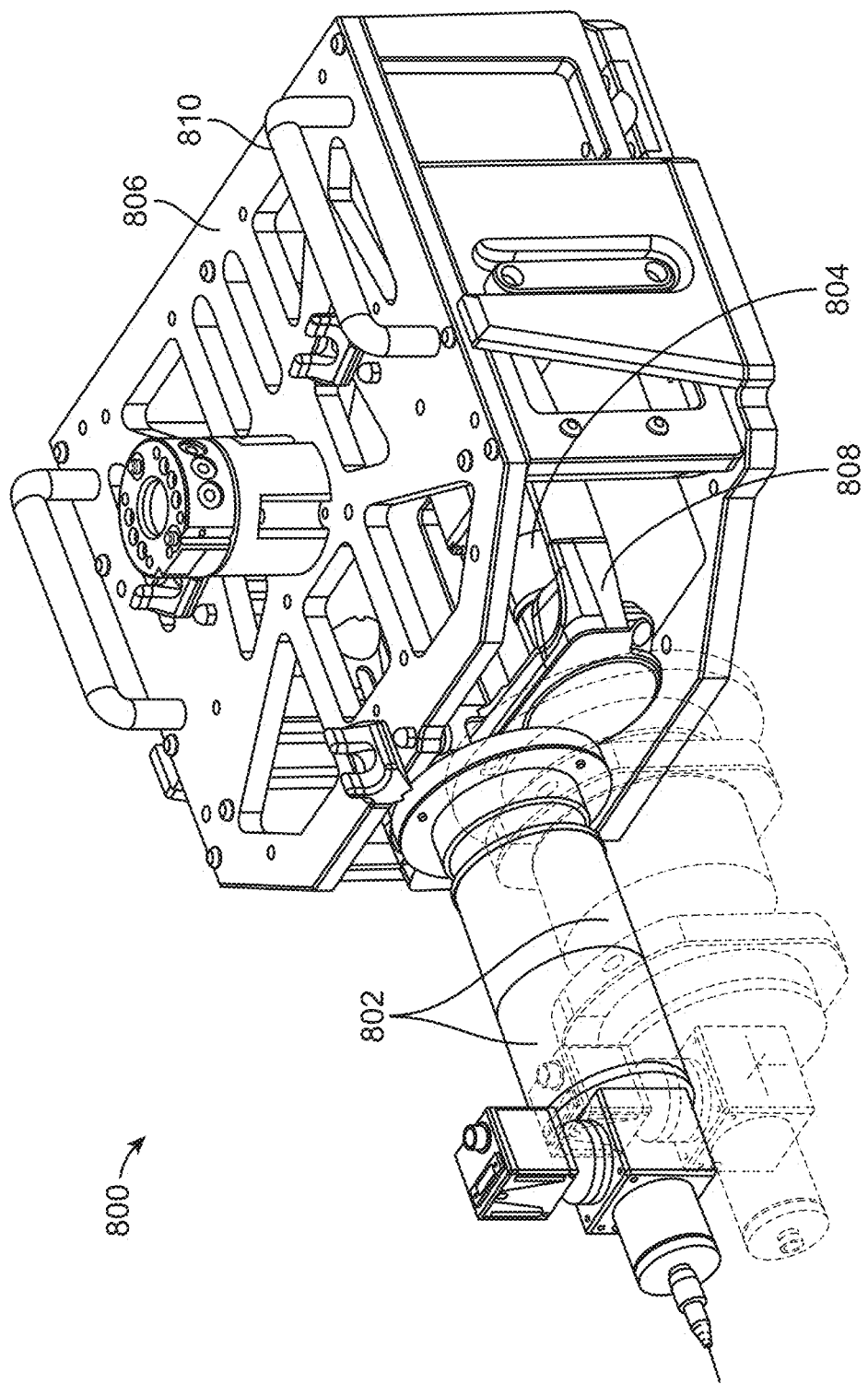
FIGS. 8A-8C illustrates an exemplary performance test station for verifying performance of an exemplary collimator assembly according to some embodiments.
Figure 8B:
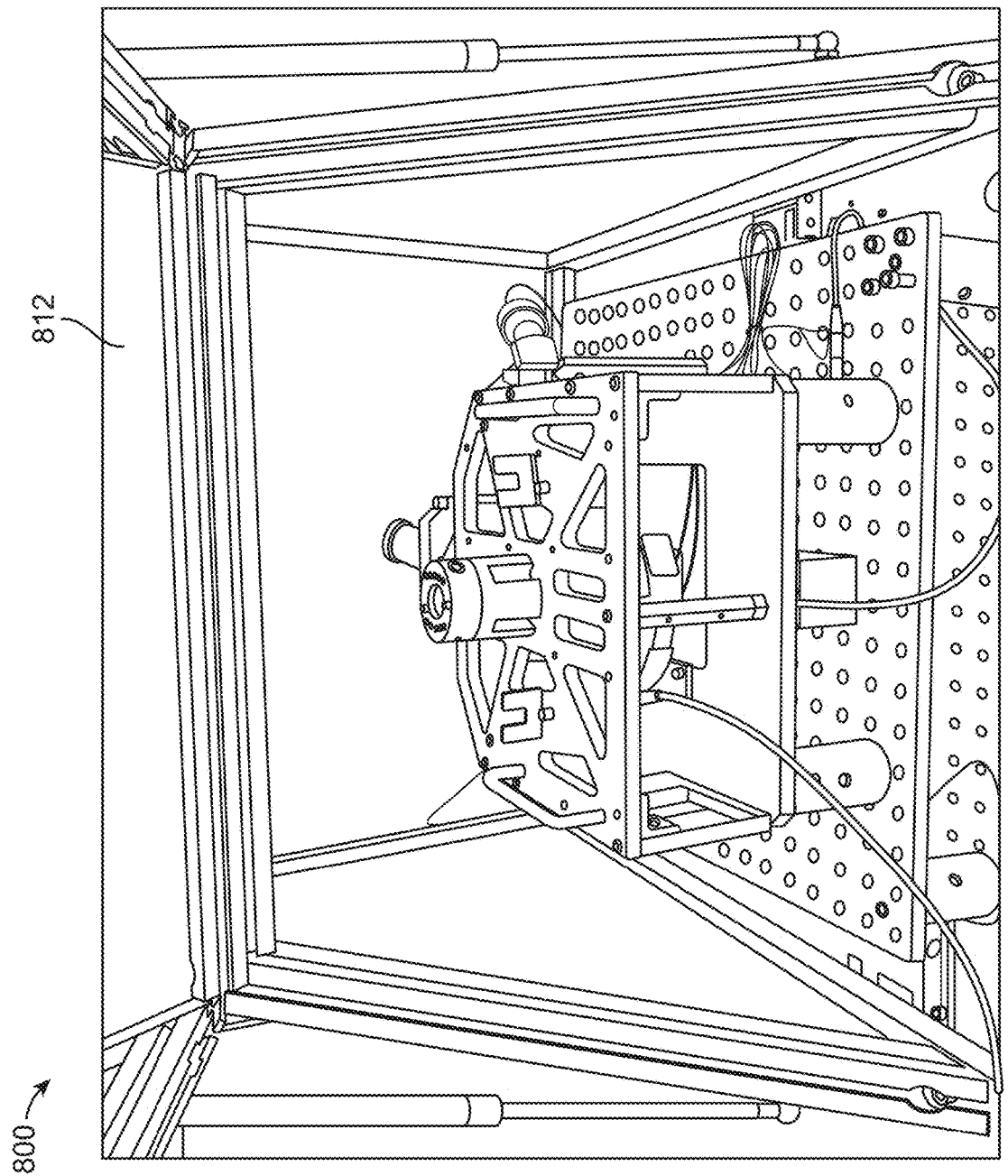
Figure 8C:
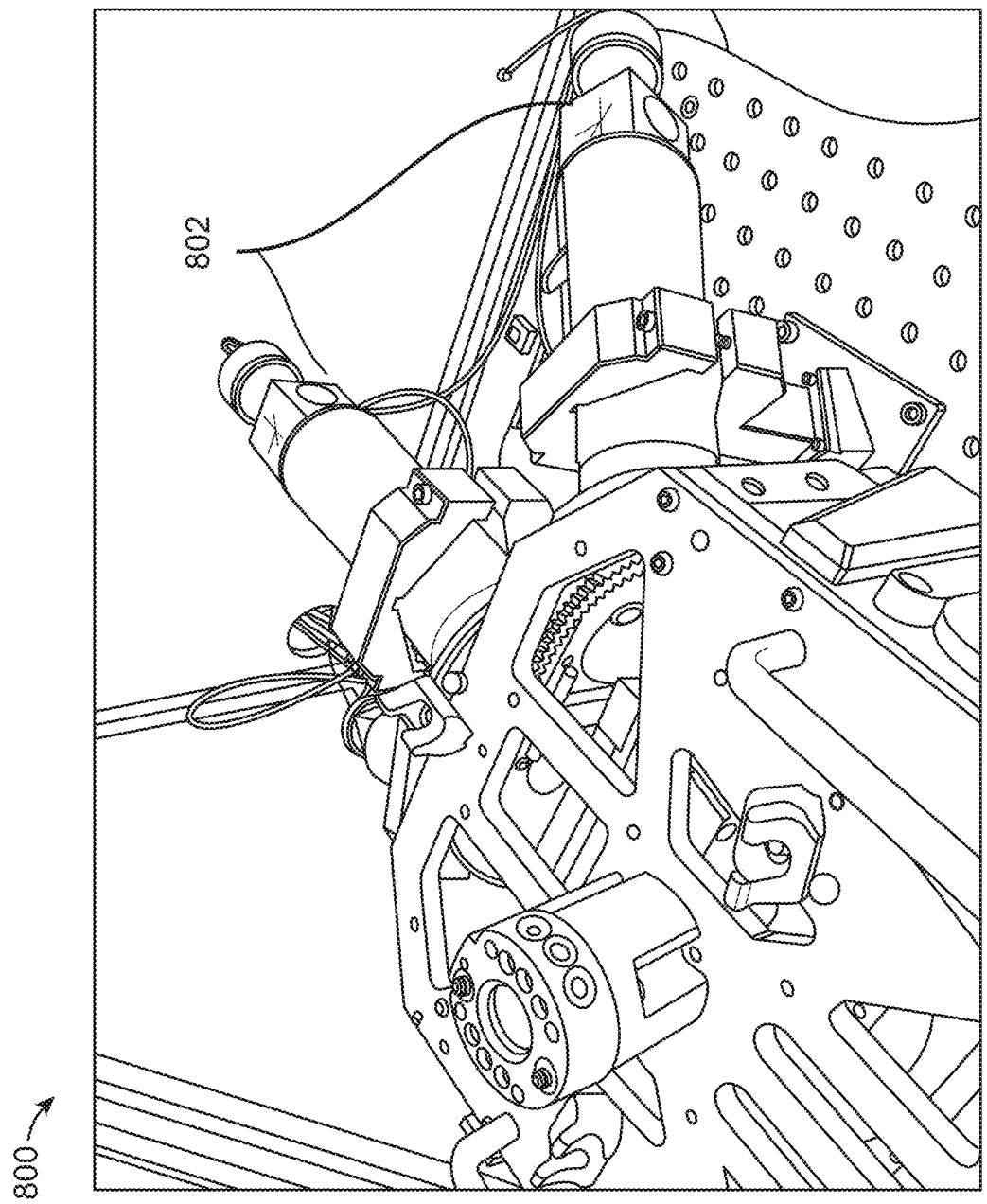

FIGS. 8A-8C illustrate an exemplary performance test station 800 for verifying performance of an exemplary collimator assembly according to some embodiments. As illustrated in FIG. 8A, the performance test station 800 includes at least one collimator assembly 802 (e.g. similar to the collimator assembly 300 illustrated in FIGS. 3A-3B). According to various embodiments, the test station 800 may be used to verify the performance of one or more collimator assemblies 802. The test station 800 includes a frame 806 on which the collimator assembly/ies 802, a gold standard camera 804 and a gold standard wearable 808 are coupled.

The test station 800 may be portable. For example, the test station 800 may be carried using one or more handles 810 coupled to the frame 806 of the test station 800. FIG. 8B illustrates a view from the back of the exemplary performance test station 800 in a testing area 812. FIG. 8C illustrates a close-up view of the top of the front portion of the exemplary performance test station 800 in the testing area 812. According to various embodiments, the testing area 812 may include an enclosure, or a box.

According to various embodiments, the collimator assembly 802 may include a 2 in. and/or a 3 in. collimator. The gold standard camera 804 and/or the gold standard wearable 808 including one or more cameras may be placed in front of the collimator assembly/ies 802. For example, the camera 804 may be used to verify the 3 in. collimator of the collimator assembly 802. The wearable 808 including one or more cameras may be used to verify the 2 in. collimator of the collimator assembly 802.

Once the collimator assemblies 802 are verified (using gold standard camera and gold standard wearable), they can be used for intrinsic calibration of a plurality of cameras of a wearable for an AR/VR system.

Figure 9:
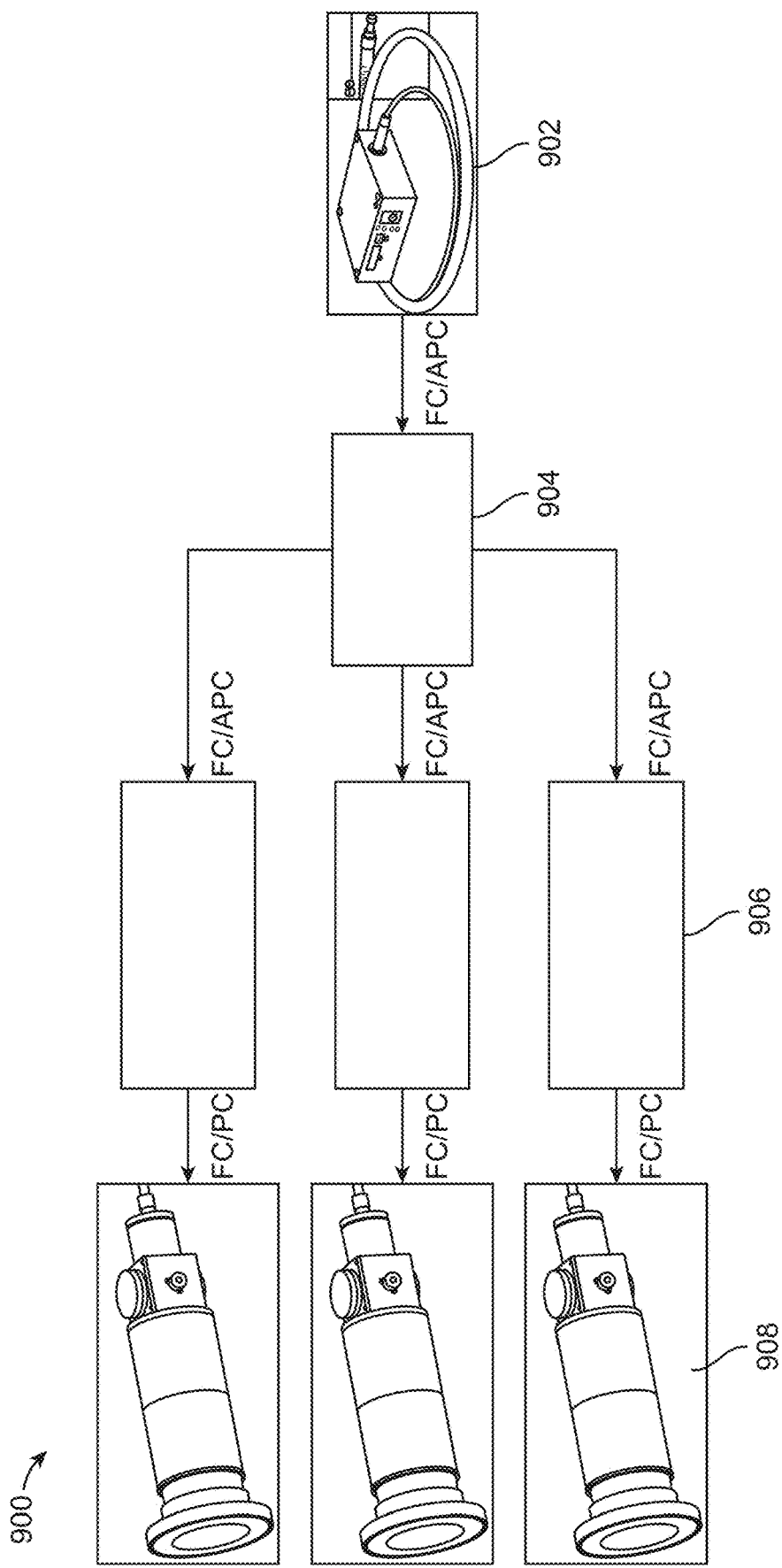
FIG. 9 illustrates an exemplary calibration station for intrinsic calibration of a plurality of cameras of a wearable for an AR/VR system according to some embodiments.

FIG. 9 illustrates an exemplary system for intrinsic calibration of a plurality of cameras of a wearable for an AR/VR system according to some embodiments. The calibration system 900 may include a solid state laser 902 that emits about 1 milliwatt laser light into a coupler 904 that sends the light into the three different collimator assemblies 908 via a plurality of connections, such as metal-sheathed fiber optic cables 906. According to various embodiments, the coupler 904 is configured to send the light into the as many different collimator assemblies as required by the system 900, and the number is not limited to three, as illustrated in FIG. 9. When the light passes through the two-sided DOE provided in each of the collimating assemblies 908, each collimating assembly produces a spot array (e.g. a light pattern), similar to that illustrated in FIG. 7.

The calibration system 900 illustrated in FIG. 9 may be used to calibrate three cameras (e.g. world cameras) of an exemplary AR/VR system by placing each one of the cameras in front of one of the collimator assemblies 908. In this illustrative example, three cameras, each placed in front of one of the collimator assemblies 908 can be intrinsically calibrated simultaneously. A frame similar to the frame 806 illustrated in FIG. 8A may be used for calibration purposes as well. One of ordinary skill in the art will appreciate that more or less cameras may be calibrated using the system illustrated in FIG. 9, for example by coupling more or less collimator assemblies to the system and using an appropriate coupler as necessary.

Figure 10:
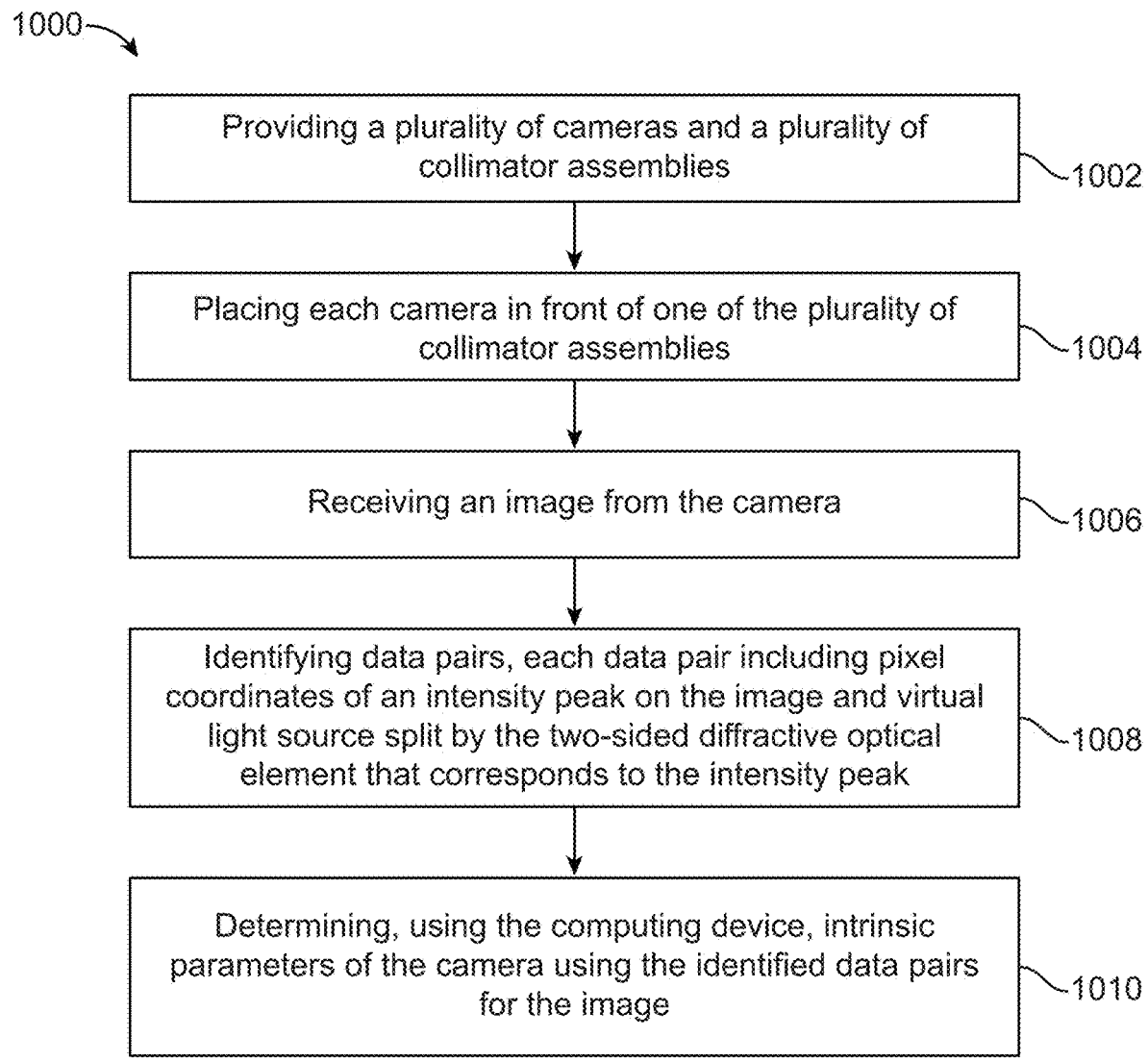
FIG. 10 is a simplified flowchart illustrating a method for intrinsic calibration of a plurality of cameras using a plurality of two-sided DOEs according to some embodiments.

FIG. 10 is a simplified flowchart 1000 illustrating a method for intrinsic calibration of a plurality of cameras using a plurality of two-sided DOEs according to some embodiments.

At step 1002, a plurality of cameras and a plurality of collimator assemblies are provided. According to various embodiments, the plurality of cameras may be coupled to an AR/VR system. For example, the cameras may be coupled to a wearable (e.g. headset) portion of the AR/VR system. In other embodiments, multiple wearables, each including one or more cameras, may be calibrated simultaneously.

In various embodiments, each collimator assembly includes a two-sided diffractive optical element (DOE). A grating pattern is formed on each surface of the two-sided DOE are provided. The two-sided DOE may include an N*N array of a first grating pattern formed on a first surface and an M*M array of a second pattern formed on a second surface. The M*M array is tiled on the second surface of the two-sided diffractive optical element to match a size of the N*N array on the first surface of the two-sided diffractive optical element, such that the image captured by each camera includes $N^2$ repeating sub-patterns. For example, in some embodiments where N=3 and M=19, the 19*19 array is tiled on the second surface of the two-sided DOE to match a size of the 3*3 array on the first surface of the two-sided DOE, such that the image captured by each camera includes 9 repeating sub-patterns.

At step 1004, the plurality of cameras are placed in front of the plurality of collimator assemblies such that each camera is placed in front of one of the plurality of collimator assemblies. For example, each camera may be configured to remain in an eye box of the two-sided DOE of respective collimator assembly. This way, the camera will be able to capture the entire light pattern produced by the respective collimator assembly.

The following steps 1006-1010 are performed for each camera among the plurality of cameras.

Accordingly, at step 1006, the method includes receiving, using a computing device, an image from the camera. The image may include an image of the light pattern formed by the laser beam passing through the collimating lens and the two-sided DOE. According to various embodiments, the grating pattern formed on each surface of the two-sided DOE is selected to reduce a brightness of a central intensity peak on the image to a predetermined amount.

According to various embodiments, the grating pattern formed on each surface of the two-sided DOE is selected to reduce the brightness of the central intensity peak on the image to about 1.1±0.5% of the laser beam emitted from the laser source. In some embodiments, the image may include a repeating sub-pattern without any gaps. For example, the image may include 9 tiles of the same sub-pattern without any gaps between the tiles.

According to various embodiments, each collimator assembly includes a collimating lens. The method may also include configuring a laser source to emit a laser beam to the collimating lens of each collimator assembly. The collimating lens of each collimator assembly is provided between the two-sided DOE and the laser source.

At step 1008, the method includes identifying, using the computing device, data pairs, each data pair including pixel coordinates of an intensity peak on the image and virtual light source formed by the two-sided DOE that corresponds to the intensity peak.

At step 1010, intrinsic parameters of the camera are determined using the computing device and the identified data pairs for the image. The intrinsic parameters may include one or more of a focal length, a principal point and distortion coefficient(s) of the camera.

It should be appreciated that the specific steps illustrated in FIG. 10 provide a particular method for determining intrinsic parameters and calibrating a camera using a two-sided DOE according to some embodiments. Other sequences of steps may also be performed according to alternative embodiments. For example, alternative embodiments may perform the steps outlined in FIG. 10 in a different order. Moreover, the individual steps illustrated in FIG. 10 may include multiple sub-steps that may be performed in various sequences as appropriate to an individual step. Furthermore, additional steps may be added or removed depending on the particular applications. One of ordinary skill in the art would recognize many variations, modifications, and alternatives.

Embodiments provide a number of advantages over prior systems. Embodiments allow calibrating the real-world image capture device and/or an AR/VR display system using one or more collimator assemblies each including a two-sided DOE having a specific grating pattern on each surface. The gratings on the two-sided DOE are formed such that the brightness of the central intensity peak on the image of the image pattern formed by the DOE is reduced to about 1.1±0.5% of the laser beam emitted from the laser source (e.g. about 1.1±0.5% of the laser beam emitted from the laser source that reaches the central intensity peak of the image reaches the central intensity peak of the image). Thus, embodiments provide a two-sided DOE that creates a light pattern whose zeroth-order virtual light source has a brightness at an optimal level (e.g. bright enough to be distinguishable over the remaining virtual light sources produced by the two-sided DOE, but not too bright so as to mislead the camera on the brightness of the neighboring virtual light sources).

Figure 11:
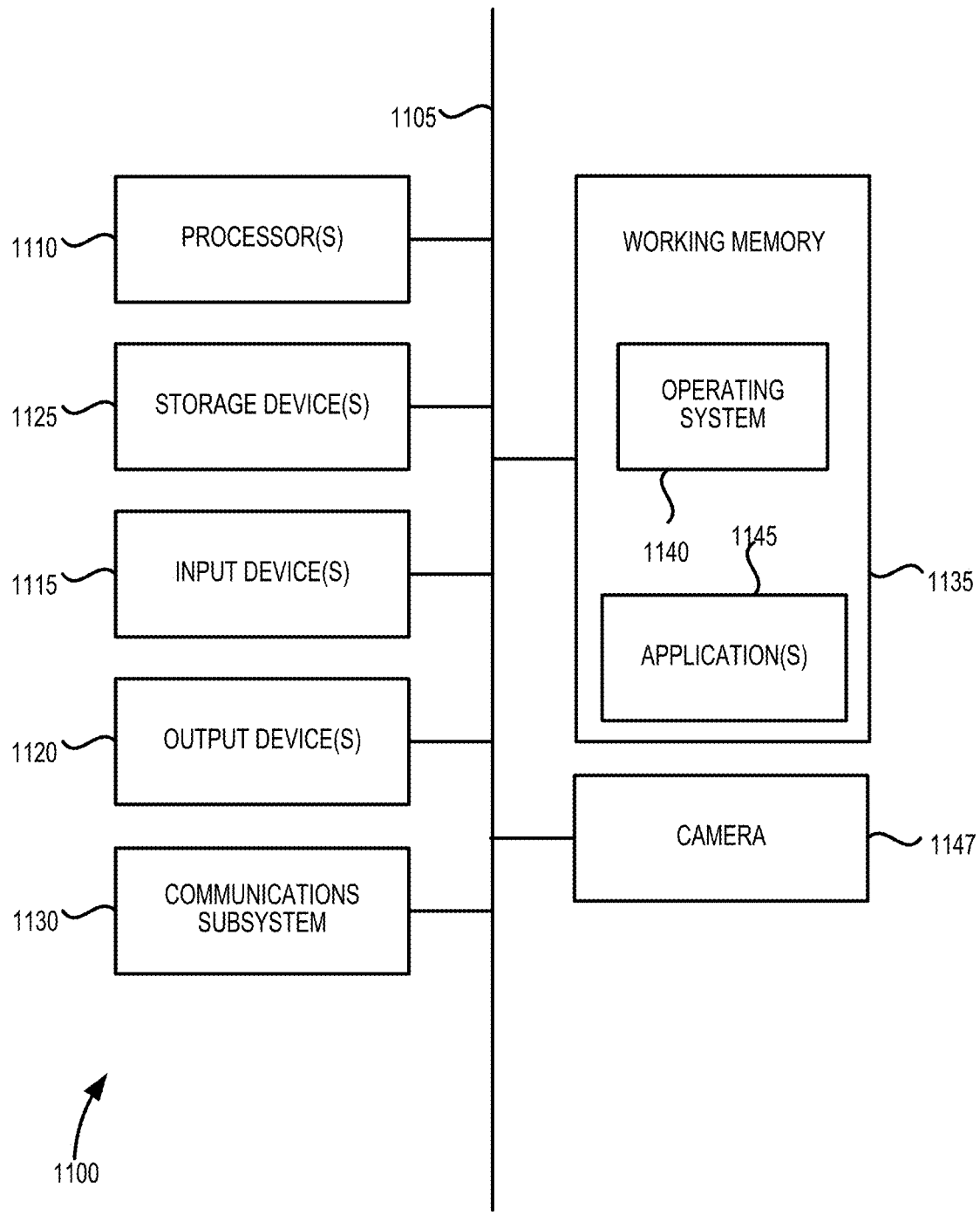
FIG. 11 is a simplified schematic diagram of a computer system (e.g. an image processing server computer) according to some embodiments.

FIG. 11 is a simplified schematic diagram of a computer system (e.g. an image processing server computer 310) according to some embodiments. Computer system 1100 as illustrated in FIG. 11, which may also be referred to as a control system, may include one more computing devices. FIG. 11 provides a schematic illustration of one embodiment of a computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include without limitation a mouse, a keyboard, a camera, and/or the like; and one or more output devices 1120, which can include without limitation a display device, a printer, and/or the like. The computer system 1100 may be in communication with a camera 1147 (e.g. camera 308) through a wired or wireless coupling, as discussed above in connection with FIG. 3A.

The computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1130. In other embodiments, a portable electronic device, e.g., the first electronic device, may be incorporated into the computer system 1100, e.g., an electronic device as an input device 1115. In some embodiments, the computer system 1100 will further comprise a working memory 1135, which can include a RAM or ROM device, as described above.

The computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1100 to perform methods in accordance with various embodiments of the technology. According to a set of embodiments, some or all of the procedures of such methods are performed by the computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for determining intrinsic parameters of a camera, the system comprising:
   a camera;

a collimator assembly, wherein the camera is placed in front of the collimator assembly, wherein the collimator assembly includes a two-sided diffractive optical element, wherein a grating pattern is formed on each surface of the two-sided diffractive optical element; and a processor coupled to the camera to receive image data from the camera, wherein the processor stores executable instructions that, when executed by the processor, cause the processor to:

receive an image from the camera, wherein the grating pattern formed on each surface of the two-sided diffractive optical element is selected to reduce a brightness of a central intensity peak on the image to a predetermined amount; and determine intrinsic parameters of the camera based on an intensity peak on the image and virtual light source formed by the two-sided diffractive optical element that corresponds to the intensity peak.

2. The system of claim 1, wherein the two-sided diffractive optical element comprises:
an N*N array of a first grating pattern formed on a first surface of the two-sided diffractive optical element; and
an M*M array of a second pattern formed on a second surface of the two-sided diffractive optical element,
wherein the M*M array is tiled on the second surface of the two-sided diffractive optical element to match a size of the N*N array on the first surface of the two-sided diffractive optical element, such that the image captured by the camera includes $N^2$ repeating sub-patterns.

3. The system of claim 2, wherein N=3 and M=19, wherein the 19*19 array is tiled on the second surface of the two-sided diffractive optical element to match a size of the 3*3 array on the first surface of the two-sided diffractive optical element, such that the image captured by the camera includes 9 repeating sub-patterns.

4. The system of claim 2, wherein the image includes a repeating sub-pattern without any gaps.

5. The system of claim 1, further comprising:
a collimating lens in the collimator assembly; and
a laser source configured to emit a laser beam to the collimating lens of the collimator assembly, wherein the collimating lens of the collimator assembly is provided between the two-sided diffractive optical element and the laser source.

6. The system of claim 5, wherein the predetermined amount is about 1.1±0.5% of the laser beam emitted from the laser source that reaches the central intensity peak of the image.

7. The system of claim 5, wherein the image corresponds to a light pattern formed by the laser beam passing through the collimating lens and the two-sided diffractive optical element.

8. The system of claim 1, wherein the intrinsic parameters include one or more of a focal length, a principal point, and distortion coefficient(s) of the camera.

9. The system of claim 1, wherein the camera is configured to remain in an eye box of the two-sided diffractive optical element of the collimator assembly.

10. A method for determining intrinsic parameters of a camera, the method comprising:
providing a camera and a collimator assembly, wherein the collimator assembly includes a two-sided diffractive optical element, wherein a grating pattern is formed on each surface of the two-sided diffractive optical element;

placing the camera in front of the collimator assembly, wherein the camera is placed in front of one of the collimator assembly;

receiving, using a computing device, an image from the camera, wherein the grating pattern formed on each surface of the two-sided diffractive optical element is selected to reduce a brightness of a central intensity peak on the image to a predetermined amount; and determining, using the computing device, intrinsic parameters of the camera based on an intensity peak on the image and virtual light source formed by the two-sided diffractive optical element that corresponds to the intensity peak.

11. The method of claim 10, wherein the two-sided diffractive optical element comprises:
an N*N array of a first grating pattern formed on a first surface of the two-sided diffractive optical element; and
an M*M array of a second pattern formed on a second surface of the two-sided diffractive optical element,
wherein the M*M array is tiled on the second surface of the two-sided diffractive optical element to match a size of the N*N array on the first surface of the two-sided diffractive optical element, such that the image captured by the camera includes $N^2$ repeating sub-patterns.

12. The method of claim 11, wherein N=3 and M=19, wherein the 19*19 array is tiled on the second surface of the two-sided diffractive optical element to match a size of the 3*3 array on the first surface of the two-sided diffractive optical element, such that the image captured by the camera includes 9 repeating sub-patterns.

13. The method of claim 10, wherein the image includes a repeating sub-pattern without any gaps.

14. The method of claim 10, wherein the collimator assembly includes a collimating lens, the method further comprising:
configuring a laser source to emit a laser beam to the collimating lens of the collimator assembly, wherein the collimating lens of the collimator assembly is provided between the two-sided diffractive optical element and the laser source.

15. The method of claim 14, wherein the predetermined amount is about 1.1±0.5% of the laser beam emitted from the laser source that reaches the central intensity peak of the image.

16. The method of claim 15, wherein the image corresponds to a light pattern formed by the laser beam passing through the collimating lens and the two-sided diffractive optical element.

17. The method of claim 10, wherein the intrinsic parameters include one or more of a focal length, a principal point and distortion coefficient(s) of the camera.

18. The method of claim 10, wherein the camera is configured to remain in an eye box of the two-sided diffractive optical element of the collimator assembly.

19. A system for calibrating a camera, the system comprising:
a camera;
a collimator assembly, wherein the camera is placed in front of the collimator assembly, wherein the collimator assembly includes a two-sided diffractive optical element, wherein a grating pattern is formed on each surface of the two-sided diffractive optical element; and
a processor coupled to the camera to receive image data from the camera, wherein the processor stores executable instructions that, when executed by the processor, cause the processor to:

receive an image from the camera, wherein the grating pattern formed on each surface of the two-sided diffractive optical element is selected to reduce a brightness of a central intensity peak on the image to a predetermined amount; and calibrate the camera based on an intensity peak on the image and virtual light source formed by the two-sided diffractive optical element that corresponds to the intensity peak.

20. The system of claim 19, further comprising a plurality of collimator assemblies and a plurality of cameras each placed in front of one of the plurality of collimator assemblies, wherein the plurality of cameras are calibrated simultaneously.

\* \* \* \* \*